W. S. WALTZ.
HEADLIGHT FOR CARS.
APPLICATION FILED MAR. 9, 1908.
916,639.
Patented Mar. 30, 1909.
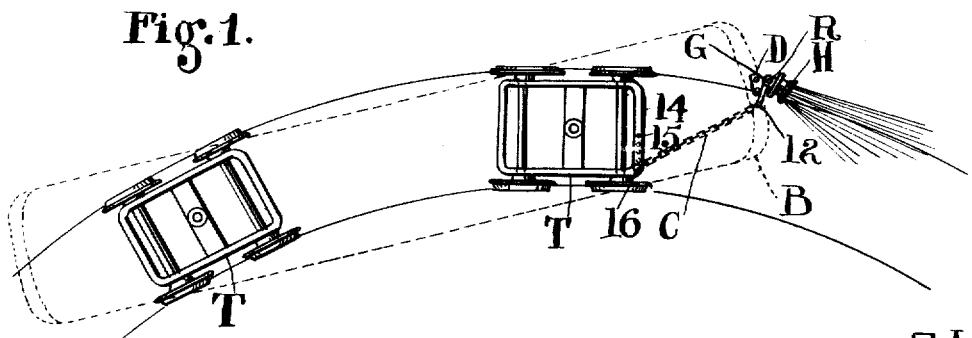
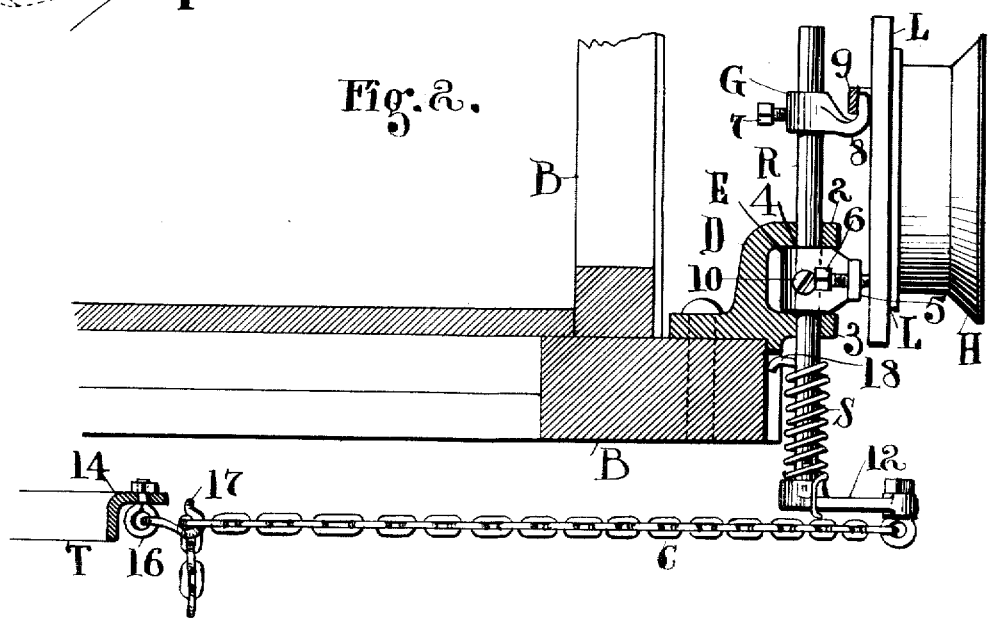
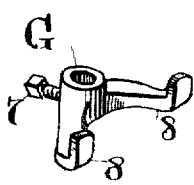
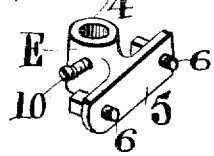
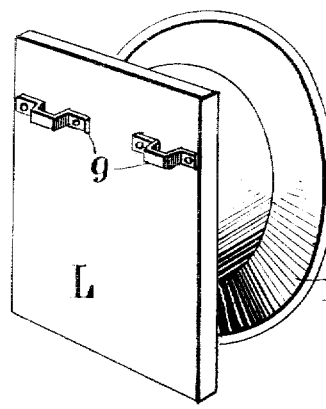
ATTEST
E. M. Fisher
J. C. Musson
INVENTOR
Winfield S. Waltz.
By Fisher & Moser ATTYS.

UNITED STATES PATENT OFFICE.

WINFIELD S. WALTZ, OF MEDINA, OHIO.

HEADLIGHT FOR CARS.

No. 916,639.　　　　Specification of Letters Patent.　　Patented March 30, 1909.

Application filed March 9, 1908. Serial No. 419,922.

*To all whom it may concern:*

Be it known that I, WINFIELD S. WALTZ, a citizen of the United States, residing at Medina, in the county of Medina and State of Ohio, have invented certain new and useful Improvements in Headlights for Cars, and do declare that the following is a full, clear, and exact description of the invention, which will enable others skilled in the art to which it appertains to make and use the same.

My invention relates to head-lights for cars, and the invention consists in a headlight and means to automatically operate the same to keep the light in line with the track about curves, all substantially as shown and described and particularly pointed out in the claims.

In the accompanying drawings, Figure 1 is a plan view mostly of a diagrammatic character showing a pair of car trucks upon a curve and an outline of a car body, a truck, and a headlight in operative relations with the front truck, the whole designed to illustrate the automatic operation of the headlight from the truck, as hereinafter more fully described. Fig. 2 is a vertical sectional elevation of the front part of a car body with a headlight and its actuating parts thereon. Figs. 3 and 4 are perspective views of brackets for the headlight, and Fig. 5 is a rear perspective of the headlight.

As indicated above and illustrated in the drawings, the invention consists chiefly in means for automatically holding the headlight in line with a car track about curves therein, so that whether a car be going on a straight piece of road or about a short turn, the headlight will constantly cast its rays upon the track and thus give the motorman or engineer the advantage of the light in making a turn or curve.

The car body is represented by B and the car-trucks by T, and H is the headlight, supported and adjustable in its relations to the said body by parts comprising a bracket D fixed rigidly but removably upon the front of the car body and adapted to support a rod R vertically therein through the two perforated ears 2 and 3 in said bracket and which are spaced apart to receive another bracket E. This bracket has a sleeve portion 4 of a size to occupy the space between said ears 2 and 3 of bracket D and a face portion 5 with set screws 6 therein adapted to bear against the supporting part or plate L of the headlight H, as seen in Figs. 2 and 5 and tilt the light to lengthen or shorten the throw thereof. The said headlight is supported from rod R by means of the carrying bracket G, which is sleeved upon rod R and adjustable by screw 7 thereon, and has forwardly projecting spreading arms 8 with upturned or hook shaped extremities adapted to engage in yokes or keepers 9 on the back of plate or part L which carries the headlight. Thus the headlight is removably suspended or hung by its yokes 9 upon the hooked arms 8, while otherwise it is free and its vertical position or throw of rays is controlled by the set screws 6 in bracket E. The elevation of the headlight as a light, is thus easily determined, because if it be desired that the light should be thrown farther in advance, the screws 6 can be adjusted to swing the bottom of the light a little higher and thus cast the rays farther forward on the track, or by withdrawing the said screws the rays of the light can be depressed and brought nearer to the car. Furthermore, two separate adjustments are provided in the foregoing mechanism. Thus, the bracket G from which the headlight hangs can be independently moved up or down on rod R and the elevation of the light be thus effected, or the rod R itself may be vertically adjusted in bracket E by and through set screw 10 which fixes its elevation in said bracket as may be desired. Thus, the said rod and parts carried thereby may be bodily raised and lowered through the adjusting screw 10 and bracket E, or the headlight may be adapted independently of the rod through bracket G while the swing of the light upon its hook supports 8 to direct the ray thereof farther from or nearer to the car is controlled through set screws 6. However, as to these parts, it may be said that while said bracket D constitutes the immediate and usual support of the other parts in the present organization, it is not to be understood that there may not be other equivalent means of support provided, and which may bring the headlight into somewhat different relations with the immediate front of the car body and all without sacrificing the essential principles of the invention.

Now, in order that the automatic operation of the headlight may be worked out with and through the foregoing mechanism, other parts are required and are operatively associated particularly with rod R. Thus, the said rod has an arm 12 extending laterally at its lower end and a chain C extends from the extremity of said arm to the forward end of the truck T back from the front of the car body, say the usual distance and relatively as shown. It is to be observed that the point of attachment with the truck is a horizontal flange 14 thereon having a series of perforations 15 in which a staple 16 is adapted to be engaged according as one position or another in said perforations will best serve the purpose of the operation of the headlight, and a hook 17 in said staple engages chain C in one or another of the links thereof according to the distance between said hook and the arm 12. The plan of operation contemplates the keeping of this chain stretched at all times, and to this end I employ a comparatively heavy spiral spring S, which is mounted and fixed at its lower end upon the said rod R while its upper end 18 is adapted to run in a vertical channel, slot or groove in the front of the car body, thus accommodating said spring to a range of vertical adjustment in connection with rod R. A peculiarity of the said spring is this, that its normal tendency is to swing the headlight through rod R into the extreme opposite position to that shown in Fig. 1, so that if the car were to take a short turn in the opposite direction from that shown in Fig. 1, the spring S would carry the headlight into a directly opposite position from that shown in said figure and that would be the limit of the throw of the headlight to the left. Hence, as long as the headlight holds a steady or forward position, as on a straight stretch of track, it is restrained from turning all the way to the left by chain C and arm 12, it being noted that the said chain is attached to one side of the truck frame and in such position that it will hold the arm 12 off to the right as respects the headlight. Of course, if the car makes a turn in the opposite direction and truck T swings oppositely from its position shown, it will relax chain C and permit spring S to assert itself and carry the headlight over a corresponding relation, so that in any event the headlight will turn with the track and shed its light thereon notwithstanding.

The value of the chain as a medium of connection between the headlight and the truck lies especially in its ready adjustability as to length, by taking up links, in its adaptation to working conditions. For example, it is designed to be stretched or taut at all times or it could not operate with spring S, and yet is flexible and readily yields to conditions without breaking or injury.

The mounting for the headlight makes rod R practically a standard for the same, so that rotation of said rod or standard will rotate the light.

What I claim is:—

1. A car body and a truck, a head-light mounted on said body and rotatable thereon according to the direction of travel, the mechanism supporting said head light comprising a rotatable standard vertically adjustable on said body and a support for the head-light vertically adjustable on said standard.

2. The combination of a car body, a headlight and a standard carrying the same, a bracket adjustable on said standard having substantially hook shaped arms from which said head-light is supported and set screws bearing against the lower portion of the head-light and adapted to regulate the inclination of the head-light.

3. The combination of a car body and a swiveled truck, with a head-light having a standard rotatably mounted on said body, a spiral spring fixed on said standard at one end and having its other end vertically movable in respect to the car body, and means to adjust said standard vertically in respect to said body.

In testimony whereof I sign this specification in the presence of two witnesses.

WINFIELD S. WALTZ.

Witnesses:
E. M. FISHER,
R. B. MOSER.